(12) United States Patent
Wilton et al.

(10) Patent No.: US 11,101,710 B2
(45) Date of Patent: Aug. 24, 2021

(54) HYBRID ROTOR ASSEMBLY FOR A MOTOR VEHICLE

(71) Applicant: GM Global Technology Operations LLC, Detroit, MI (US)

(72) Inventors: Daryl A. Wilton, Macomb, MI (US); Clinton E. Carey, Highland, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 146 days.

(21) Appl. No.: 16/366,316

(22) Filed: Mar. 27, 2019

(65) Prior Publication Data
US 2020/0313483 A1 Oct. 1, 2020

(51) Int. Cl.
| | | |
|---|---|---|
| H02K 1/30 | (2006.01) |
| H02K 1/32 | (2006.01) |
| H02K 7/00 | (2006.01) |
| H02K 7/08 | (2006.01) |
| H02K 7/10 | (2006.01) |
| F16H 41/00 | (2006.01) |
| B60K 17/02 | (2006.01) |

(52) U.S. Cl.
CPC ............ *H02K 1/30* (2013.01); *H02K 1/32* (2013.01); *H02K 7/006* (2013.01); *H02K 7/085* (2013.01); *H02K 7/10* (2013.01); *B60K 17/02* (2013.01); *B60Y 2306/05* (2013.01); *B60Y 2400/60* (2013.01); *F16H 41/00* (2013.01)

(58) Field of Classification Search
CPC .......... H02K 1/26; H02K 1/2706; H02K 7/08; H02K 7/14
USPC .................... 310/75 R, 76, 92, 98
See application file for complete search history.

(56) References Cited

U.S. PATENT DOCUMENTS

| | | | | |
|---|---|---|---|---|
| 2012/0080286 A1* | 4/2012 | Kasuya | .................... | B60K 6/48 192/113.3 |
| 2013/0221789 A1* | 8/2013 | Atkinson | ............. | H02K 1/2773 310/156.67 |
| 2019/0052136 A1* | 2/2019 | Gieras | ..................... | H02K 1/27 |
| 2020/0014283 A1* | 1/2020 | Payne | .................. | F16D 13/683 |

* cited by examiner

*Primary Examiner* — Jose A Gonzalez Quinones
(74) *Attorney, Agent, or Firm* — Cantor Colburn LLP

(57) ABSTRACT

An electric motor rotor for a motor vehicle includes a rotor assembly having a first portion formed from a first material, a second portion formed from a second material coupled to the first portion, and a third portion formed from a third material coupled to one of the first portion and the second portion. At least one of the first material and the third material is distinct from the second material.

20 Claims, 2 Drawing Sheets

HYBRID ROTOR ASSEMBLY FOR A MOTOR VEHICLE

The subject disclosure relates to the art of motor vehicles and, more particularly, to a hybrid rotor assembly for a motor vehicle.

Currently, many motor vehicles include electric motors. The motor vehicle may be a hybrid model, in which the electric motor works in conjunction with an internal combustion engine, or a pure electric vehicle, in which the electric motor provides all motive force. In vehicles having an automatic transmission, the electric motor is connected to the torque converter. Specifically, a rotor portion of the electric motor may be attached to the torque converter.

Typically, the rotor is formed from steel or cast iron. Both steel and cast iron are heavy metals that are easily manipulated through machining or casting techniques to support various motor elements. Steel and cast iron materials impart a moment of inertia to the torque converter that may be higher than desired. That is, the inertia developed by steel and cast iron materials may require the use of more robust clutch materials to lock up the torque converter or may prolong energy dissipation. Accordingly, manufacturers would welcome a rotor that is designed to impart less inertia to the torque converter.

SUMMARY

In one exemplary embodiment, an electric motor rotor for a motor vehicle includes a rotor assembly having a first portion formed from a first material, a second portion formed from a second material coupled to the first portion, and a third portion formed from a third material coupled to one of the first portion and the second portion. At least one of the first material and the third material is distinct from the second material.

In addition to one or more of the features described above or below, or as an alternative, further embodiments could include wherein the second portion is coupled to and arranged radially outwardly of the first portion.

In addition to one or more of the features described above or below, or as an alternative, further embodiments could include wherein the third material is arranged radially outwardly of and coupled to the second material.

In addition to one or more of the features described above or below, or as an alternative, further embodiments could include wherein the first portion defines an inner rotor hub, the second portion defines a center support, and the third portion defines an outer hub.

In addition to one or more of the features described above or below, or as an alternative, further embodiments could include wherein the first material is substantially similar to the third material.

In addition to one or more of the features described above or below, or as an alternative, further embodiments could include wherein the first material and the third material comprise at least one of steel and cast iron and the second material comprises at least one of aluminum and magnesium.

In addition to one or more of the features described above or below, or as an alternative, further embodiments could include wherein the second portion is connected to the third portion through a mechanical fastener.

In addition to one or more of the features described above or below, or as an alternative, further embodiments could include a cavity formed between the second portion and the third portion.

In addition to one or more of the features described above or below, or as an alternative, further embodiments could include a bearing mounted to the first portion, the bearing being formed from a material that is substantially similar to the first material.

In another exemplary embodiment, a motor vehicle system includes an automatic transmission including a torque converter, and an electric motor rotor coupled to the torque converter. The electric motor rotor includes a rotor assembly having a first portion formed from a first material, a second portion formed from a second material coupled to the first portion, and a third portion formed from a third material coupled to one of the first portion and the second portion. At least one of the first material and the third material is distinct from the second material.

In addition to one or more of the features described above or below, or as an alternative, further embodiments could include wherein the second portion is coupled to and arranged radially outwardly of the first portion.

In addition to one or more of the features described above or below, or as an alternative, further embodiments could include wherein the third material is arranged radially outwardly of and coupled to the second material.

In addition to one or more of the features described above or below, or as an alternative, further embodiments could include wherein the first portion defines an inner rotor hub, the second portion defines a center support, and the third portion defines an outer hub.

In addition to one or more of the features described above or below, or as an alternative, further embodiments could include wherein the first material is substantially similar to the third material.

In addition to one or more of the features described above or below, or as an alternative, further embodiments could include wherein the first material and the third material comprise at least one of steel and cast iron and the second material comprises at least one of aluminum and magnesium.

In addition to one or more of the features described above or below, or as an alternative, further embodiments could include wherein the second portion is connected to the third portion through a mechanical fastener.

In addition to one or more of the features described above or below, or as an alternative, further embodiments could include a cavity formed between the second portion and the third portion.

In addition to one or more of the features described above or below, or as an alternative, further embodiments could include a bearing mounted to the first portion, the bearing being formed from a material that is substantially similar to the first material.

In yet another exemplary embodiment a method of forming a rotor for an electric vehicle includes joining a first portion formed from a first material to a second portion formed from a second material with the second portion being arranged radially outwardly of the first portion, and joining a third portion formed from a third materially to the second portion with the third portion being arranged radially outwardly of the second portion and at least one of the first material and the third material being distinct from the second material.

In addition to one or more of the features described above or below, or as an alternative, further embodiments could include wherein joining the first portion to the second portion includes creating an interference fit between the first portion and the second portion.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
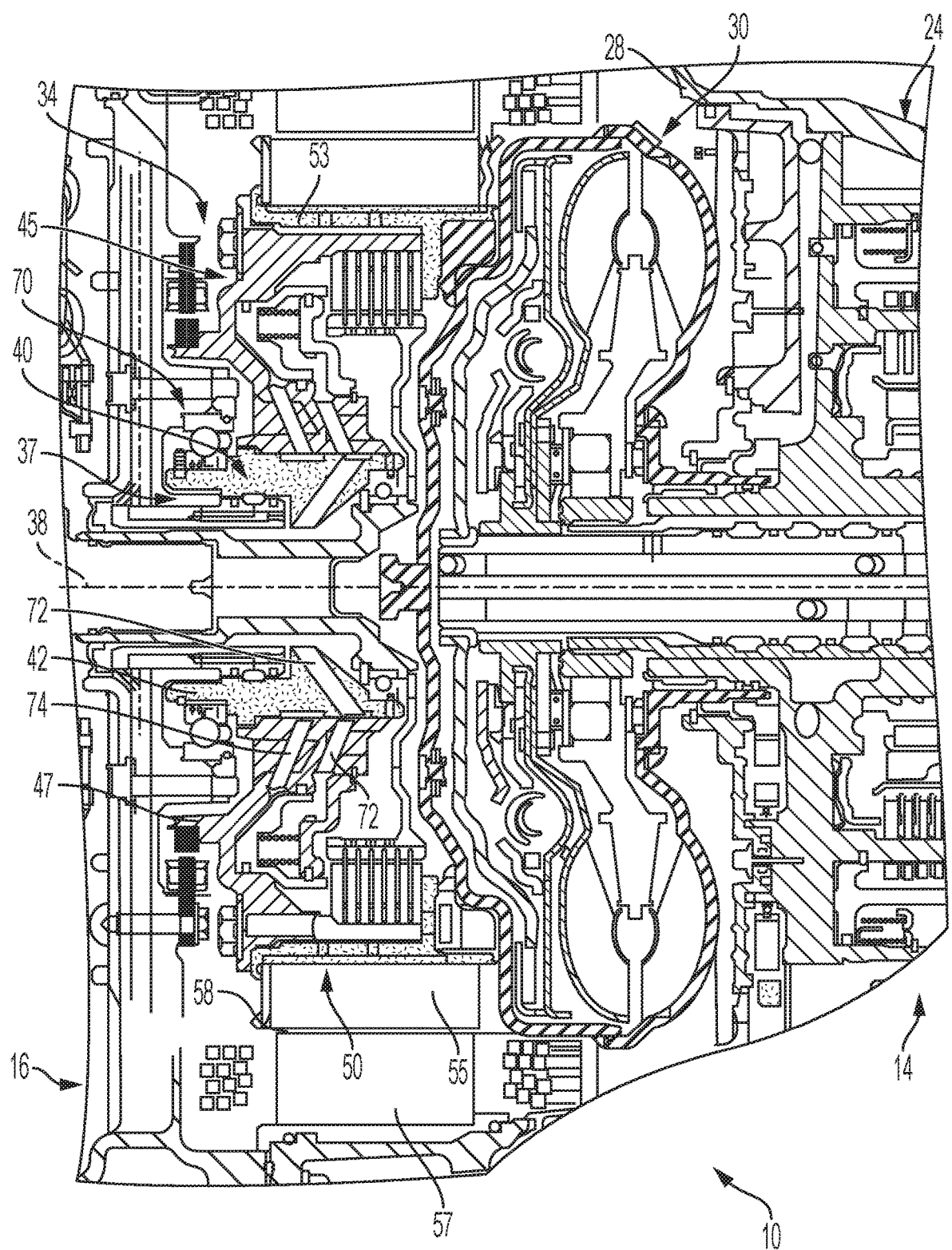
FIG. 1 is a partial, cross-sectional, side, schematic view of a motor vehicle system including a transmission portion and an electric motor portion, in accordance with an exemplary embodiment.
Figure 2:
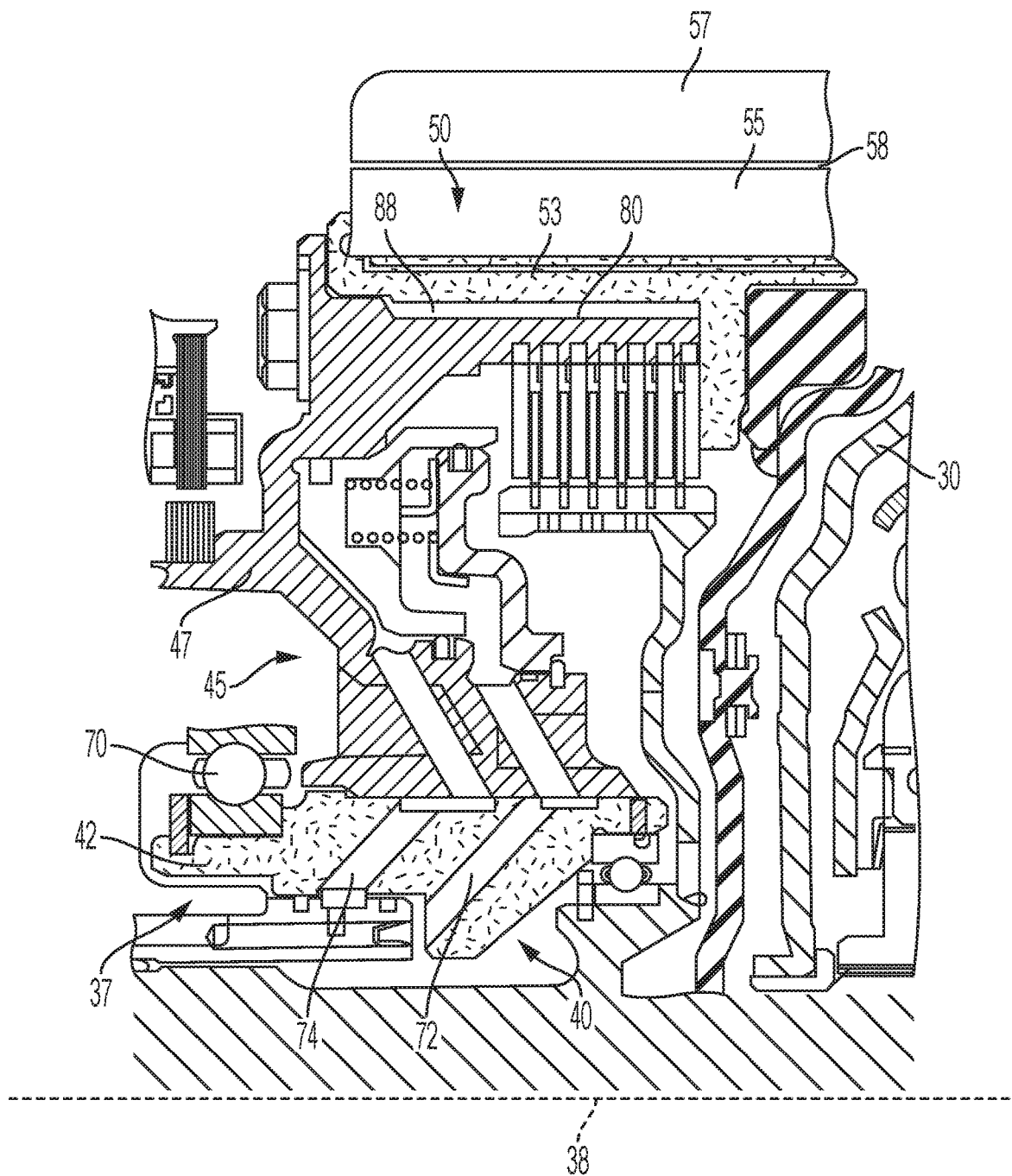
FIG. 2 is a partial, cross-sectional view of an electric motor rotor, in accordance with an aspect of an exemplary embodiment.

The following description is merely exemplary in nature and is not intended to limit the present disclosure, its application or uses. It should be understood that throughout the drawings, corresponding reference numerals indicate like or corresponding parts and features.

A motor vehicle system, in accordance with an exemplary embodiment, is indicated generally at 10 in FIG. 1. Motor vehicle system 10 includes a transmission portion 14 and an electric motor portion 16. In an embodiment, electric motor portion 16 may be connected to an internal combustion engine (not shown). Transmission portion 14 includes a transmission housing 24 having a bell housing portion 28. A torque converter 30 is arranged in bell housing portion 28 and operatively connected to transmission portion 14.

In an embodiment, electric motor portion 16 includes a rotor 34 that may be mechanically connected to torque converter 30. Rotor 34 includes a rotor support or housing 37. Rotor 34 may rotate about a central axis 38 and includes a first portion 40 that may define an inner hub 42, a second portion 45 that may define a center support 47, and a third portion 50 that may define an outer hub 53. Outer hub 53 supports a plurality of steel rotor laminations 55. Rotor laminations 55 are spaced from a stator 57 by a rotor stator gap 58.

In an embodiment, second portion 45 is arranged radially outwardly of, and mechanically joined to, first portion 40. Similarly, third portion 50 is arranged radially outwardly of and mechanically joined to second portion 45 through, for example, a mechanical fastener (not separately labeled). First portion 40 may support a bearing 70 that is coupled to rotor support 37. First portion 40 and second portion 45 may include one or more oil passages indicated at 72 and 74 respectively.

In an embodiment, first portion 40 is formed from a first material (not separately labeled), second portion 45 is formed from a second material (also not separately labeled), and third portion 50 is formed from a third material (also not separately labeled). The first material and the third material may be substantially the same. In an embodiment, first portion 40 is formed from steel, second portion 45 is formed from aluminum, and third portion 50 is formed from steel. The steel used to form third portion 50 may be substantially similar to the steel used in first portion 40. Cast iron may also be used to form third portion 50 and first portion 40. In addition, magnesium or other light weight metals may be used to form second portion 45.

First portion 40 may be joined to second portion 45 through a variety of techniques. In an embodiment, first portion 40 may be joined to second portion 45 through an interference fit. Similarly, second portion 45 may be joined to third portion 50 through a plurality of techniques. In an embodiment, second portion 45 may be joined to third portion 50 through an interference fit. In another embodiment, second portion 45 may be joined to third portion 50 through a slip fit. Still further, an outer surface 80 of second portion 45 may be machined after being joined to first portion 40 so as to better control radial tolerances as well as rotor stator gap 58.

In further accordance with an exemplary aspect, a cavity 88 is formed between second portion 45 and third portion 50. Cavity 88 may provide space for a circulating coolant for rotor 34. Still further, the first material used to form first portion 40 may be substantially similar to material used to form bearing 70. By substantially similar, it should be understood that the first material and the material used to form bearing 70 include substantially similar mechanical and thermal properties. In this manner, thermal expansion/contraction effects between bearing 70 and first portion 40 may be mitigated.

The terms "about" and "substantially" are intended to include the degree of error associated with measurement of the particular quantity based upon the equipment available at the time of filing the application. For example, "about" and/or "substantially" can include a range of ±8% or 5%, or 2% of a given value.

At this point, it should be understood that the exemplary embodiments describe a rotor for an electric motor in a vehicle that is formed from multiple components. The multiple component or hybrid rotor is formed from materials that are selected to support loads for each section of the rotor while also achieving a reduction in weight. The reduction in weight leads to a lower moment of inertia that would be transferred to the torque converter.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An electric motor rotor for a motor vehicle comprising:
a rotor assembly including a first portion formed from a first material, a second portion formed from a second material coupled to the first portion, and a third portion formed from a third material coupled to one of the first portion and the second portion, the third portion defining an outer hub, at least one of the first material and the third material being distinct from the second material; and
a plurality of rotor laminations extending radially outwardly of and supported by the outer hub.

2. The electric motor rotor according to claim 1, wherein the second portion is coupled to and arranged radially outwardly of the first portion.

3. The electric motor rotor according to claim 2, wherein the third material is arranged radially outwardly of and coupled to the second material.

4. The electric motor rotor according to claim 1, wherein the first portion defines an inner rotor hub and the second portion defines a center support.

5. The electric motor rotor according to claim 1, wherein the first material is substantially similar to the third material.

6. The electric motor rotor according to claim 5, wherein the first material and the third material comprise at least one of steel and cast iron and the second material comprises at least one of aluminum and magnesium.

7. The electric motor rotor according to claim 1, wherein the second portion is connected to the third portion through a mechanical fastener.

8. The electric motor rotor according to claim 1, further comprising: a cavity formed between the second portion and the third portion.

9. The electric motor rotor according to claim 1, further comprising: a bearing mounted to the first portion, the bearing being formed from a material that is substantially similar to the first material.

10. A motor vehicle system comprising:
an automatic transmission including a torque converter; and
an electric motor rotor coupled to the torque converter, the electric motor rotor comprising:
a rotor assembly including a first portion formed from a first material, a second portion formed from a second material coupled to the first portion, and a third portion formed from a third material coupled to one of the first portion and the second portion, the third portion defining an outer hub, at least one of the first material and the third material being distinct from the second material; and
a plurality of rotor laminations extending radially outwardly of and supported by the outer hub.

11. The system according to claim 10, wherein the second portion is coupled to and arranged radially outwardly of the first portion.

12. The system according to claim 11, wherein the third material is arranged radially outwardly of and coupled to the second material.

13. The system according to claim 10, wherein the first portion defines an inner rotor hub, and the second portion defines a center support.

14. The system according to claim 10, wherein the first material is substantially similar to the third material.

15. The system according to claim 14, wherein the first material and the third material comprise at least one of steel and cast iron and the second material comprises at least one of aluminum and magnesium.

16. The system according to claim 10, wherein the second portion is connected to the third portion through a mechanical fastener.

17. The system according to claim 10, further comprising: a cavity formed between the second portion and the third portion.

18. The system according to claim 10, further comprising: a bearing mounted to the first portion, the bearing being formed from a material that is substantially similar to the first material.

19. A method of forming a rotor for an electric vehicle comprising:
joining a first portion formed from a first material to a second portion formed from a second material, the second portion being arranged radially outwardly of the first portion;
joining a third portion formed from a third material to the second portion, the third portion defining an outer hub and being arranged radially outwardly of the second portion, wherein at least one of the first material and the third material being distinct from the second material; and
supporting a plurality of laminations on the rotor, the plurality of laminations extending radially outwardly of the outer hub.

20. The method of claim 19, wherein joining the first portion to the second portion includes creating an interference fit between the first portion and the second portion.

* * * * *